United States Patent
Rowland-Hill et al.

[15] 3,696,815
[45] Oct. 10, 1972

[54] DETACHABLE SIDE PLATE FOR A THRESHING AND SEPARATING UNIT OF AN AXIAL FLOW COMBINE

[72] Inventors: Edward W. Rowland-Hill, Lancaster; Edwin O. Margerum, Paradise, both of Pa.

[73] Assignee: Sperry Rand Corporation, New Holland, Pa.

[22] Filed: Dec. 20, 1971

[21] Appl. No.: 209,721

Related U.S. Application Data

[63] Continuation-in-part of Ser. No. 55,299, July 6, 1970, abandoned.

[52] U.S. Cl. .............................. 130/27 J, 130/27 T
[51] Int. Cl. ............................................. A01f 12/26
[58] Field of Search ........ 130/27 R, 27 J, 27 K, 27 L, 130/27 T; 56/12.8

[56] References Cited
UNITED STATES PATENTS 1,736,775  11/1929  Ayers ....................... 130/27 T
2,053,148  9/1936  James ....................... 130/27 T

*Primary Examiner*—A. F. Guida
*Attorney*—John C. Thompson et al.

[57] ABSTRACT

A longitudinally extending cylindrical casing of an axial flow threshing and separating unit of a combine has an outer side plate member extending circumferentially upwardly from the bottom concave portion of the casing. The side plate member is pivotally and detachably attached to the concave and is adapted to move with the concave as the concave is adjusted. The side plate is positioned along the concave to retain the removable rods of the concave. The detachment of the side plate provides ample access to the rotor disposed within the casing and to the concave. Different types of side plates may be mounted in the concave to vary the threshing and separating characteristics of the combine for different type s of crops.

14 Claims, 9 Drawing Figures

PATENTED OCT 10 1972 3,696,815

INVENTOR.
EDWARD WILLIAM ROWLAND-HILL
EDWIN O. MARGERUM
BY
John L. Thompson
ATTORNEY

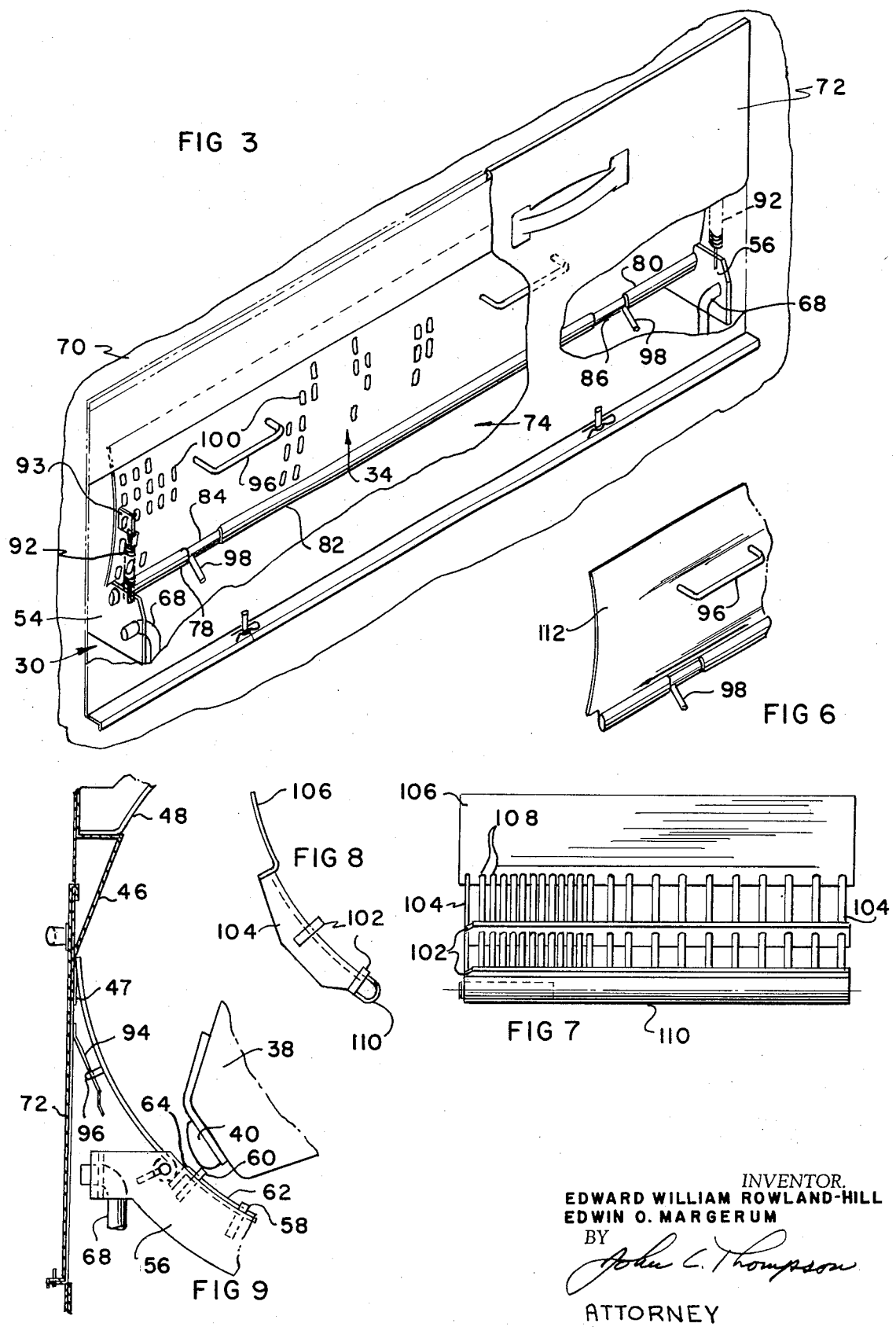

DETACHABLE SIDE PLATE FOR A THRESHING AND SEPARATING UNIT OF AN AXIAL FLOW COMBINE

RELATED APPLICATIONS

This invention relates to patent application Ser. No. 790,145, filed Jan. 9, 1969 and entitled "An Axial Flow Threshing and Separating Machine", and is a continuation-in-part of U.S. patent application Ser. No. 55,299, filed on July 6, 1970, and entitled "Detachable Thresher Side Plate and Concave Rod Retention Means", now abandoned.

FIELD OF THE INVENTION

This invention relates generally to agricultural equipment and more particularly to axial flow combines of the type having longitudinally extending axial flow units mounted within the framework of the combine.

BACKGROUND OF THE INVENTION

A combine is an agricultural machine which is adapted to be propelled over a field of crop material and which cuts, threshes, and cleans grain and grain like material. Most commercially available combines of today have a header (which separates the grain bearing portion of the crop from the stubble which is to be left in the field), a rotatable threshing member (called a cylinder) disposed about a generally transverse axis and cooperable with a concave to thresh crop material conveyed rearwardly from the header by a crop elevator structure. In order to facilitate the threshing of a wide variety of crops the concave is adjustably mounted to move towards and away from the cylinder and is provided with a plurality of rods which may be selectively removed to handle different types of crops. In order to remove the rods of the concaves, or to provide other service to the cylinder and concave, it is necessary to remove the header and the crop elevator from the front of the machine. For field repairs or field modifications of concaves or cylinders to different types of crops the detachment is difficult and time consuming. Thus, the cylinder and concave of conventional commercially available combines is to a large extent inaccessible for repairs and modifications in view of the effort required to render the threshing units accessible.

An axial flow combine, to which this invention relates, differs from the generally commercial available combines of today by having its rotatable threshing member (called a rotor) disposed about a longitudinal axis, rather than about a transverse axis. The rotor of an axial flow combine is mounted within a generally cylindrical casing and is adapted to receive crop material at its forward end and spirally convey the crop material through the cylindrical casing while threshing and separating grain from its "straw". Thus a forward portion of the rotor is provided with rasp bars or other means which normally cooperate with a concave in a bottom forward portion of the cylindrical casing to thresh the crop material introduced thereto. In order to make an axial flow combine more versatile it is desirable to mount the concave in such a manner that it is vertically shiftable relative to the rotor. Such a mounting is shown in U.S. Application Ser. No. 51,251, now U.S. Pat. No. 3,631,862, issued Jan. 4, 1972.

In prior art patents relating to axial flow threshing machines having shiftable concaves or the like, such as the James U.S. Pat. No. 2,053,148 or the Gullickson et al. U.S. Pat. No. 3,589,111 no means have been provided for the ready access to the interior of the generally cylindrical casing for servicing of the rasp bars mounted on the rotor, for the removal or replacement of rods extending through the concave, or for other servicing.

In other prior art relating to stationary threshing machines, such as the Ayers U.S. Pat. No. 1,736,775 or the Jorg U.S. Pat. No. 2,377,238 hinged doors have been disclosed. While these doors can provide access to the interior of a generally cylindrical casing, this approach is not particularly suitable for a mobile combine which operates in the field, as space is at a premium and it is difficult to provide the clearance required for a hinged access door. Furthermore, these approaches are not directly suitable for a combine of the type having a concave movable with respect to the axial flow rotor.

U.S. Pat. No. 3,470,881 granted Oct. 7, 1969 to W. H. Knapp et al. discloses a recent approach to providing service to the concave of an axial flow combine. In this design the concave is mounted for forward movement and thus it is necessary to remove the header and crop elevator in order to service the concave. If it is necessary to service the rotor then the rotor must be pulled from the cylindrical casing before it can be properly serviced.

OBJECTS AND SUMMARY OF THE INVENTION

It is a principal object of this invention to provide an axial flow combine with removable side plate means to provide ready access to the interior of the cylindrical casing which surrounds the rotor whereby the rotor and/or interior of the casing may be serviced, and also at the same time to provide removable means to facilitate the addition or removal of concave wires or rods.

More specifically it is an object of this invention to provide an axial flow combine having a vertically shiftable lower concave with side plate structure mounted on a longitudinal edge of the concave and extending upwardly therefrom, the side plate structure being removable to provide access to the interior of the cylindrical casing which surrounds the axial flow rotor.

It is further object of this invention to provide means to bias the upper ends of a removable mounted concave side plate extension into sliding contact with a vertically extending surface whereby a generally cylindrical configuration can be maintained about the rotor as the concave is adjusted towards and away from its rotor.

It is another object of this invention to provide a removable concave side plate extension for an axial flow combine, whereby different forms of side plates can be inserted for handling different types of crops.

It is a further object of this invention to provide a detachable side plate for an axial flow combine in which the upper portion of the side plate is spaced further away from the periphery of the rotors of the axial flow combine than the lower portion to facilitate the separation of threshed grain.

It is another object of this invention to provide an axial flow combine of the type having two longitudinally extending side-by-side threshing and separating units with removable side plate members disposed to the outer sides of each of the axial flow units.

The above objects and others are obrained by mounting a curved side plate structure (which may be either impervious, apertured, or of cell type construction depending upon the type of crop material to be threshed) along one of the longitudinal extending edges of a concave, the side plate structure normally holding in the concave wires rods but permitting their removal upon removal of the side plate structure, the side plate structure also being biased outwardly by a spring device into sliding contact with a vertically extending structure so as to maintain a generally cylindrical shaped casing about the rotor of an axial flow unit as the concave is vertically adjusted with respect to the rotor of the axial flow unit.

These and other objects and advantages of this invention will be apparent to those skilled in the art after a consideration of the following detailed description taken in conjunction with the accompanying drawings, in which preferred forms of this invention are illustrated.

BRIEF DESCRIPTION OF THE DRAWINGS

FIG. 3 is a fragmentary perspective view of the left side of the concave showing a portion of the concave and detachable side plate structure, the side plate structure being apertured to provide for the further separation of grain.

FIG. 6 illustrates an impervious side plate structure which may be substituted for the apertured side plate structure of FIG. 3.

FIGS. 7 and 8 show side and end views of a side plate structure having a cell grate construction providing for the further threshing and separating of crop material.

FIG. 9 illustrates a modification of the structure shown in FIG. 2 wherein a different form of spring means is employed to hold the upper end of the side plate structure in vertical sliding engagement with a generally vertically extending structure.

DETAILED DESCRIPTION OF THE DRAWINGS

In the following description right-hand and left-hand reference is determined by standing to the rear of the axial flow combine and facing in the direction of travel.

Figure 1:
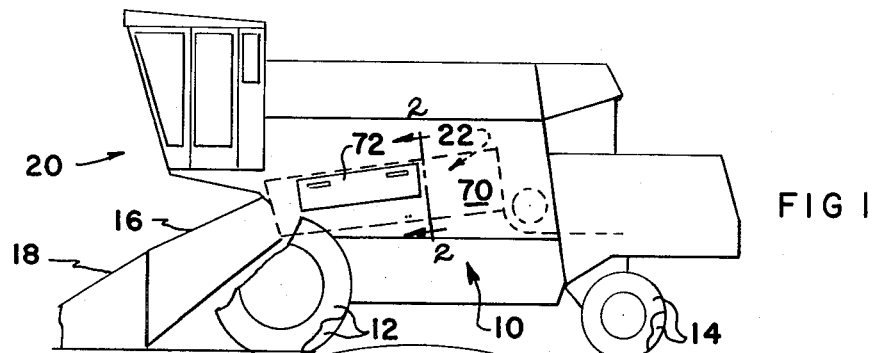
FIG. 1 is a side view of an axial flow type combine in which the principles of this invention have been incorporated.

Referring first to FIG. 1 an axial flow combine is illustrated having a frame or housing, indicated generally at 10, supported on front drive wheels 12 and rear steering wheels 14. Extending forwardly from the frame 10 is a crop elevator disposed within a feeder housing 16, the feeder housing supporting at its forward end a header 18. An operator's cab, indicated generally at 20, is supported on an upper forward portion of the frame. In a preferred form of the axial flow unit illustrated in FIG. 1, a pair of generally side-by-side longitudinally extending axial flow units 22 are mounted within the housing 10, the forward ends of the units being adapted to receive crop material from the crop elevator disposed within the feeder housing 16. Disposed underneath the axial flow threshing and separating units 22 are grain handling and cleaning means which conventionally are in the form of a grain pan 24 and a fan and sieves (not illustrated) to the rear of the grain pan. While two axial flow units are preferred, it should be appreciated that the principles of this invention may be incorporated in an axial flow combine having a single longitudinally extending axial flow unit.

Figure 2:
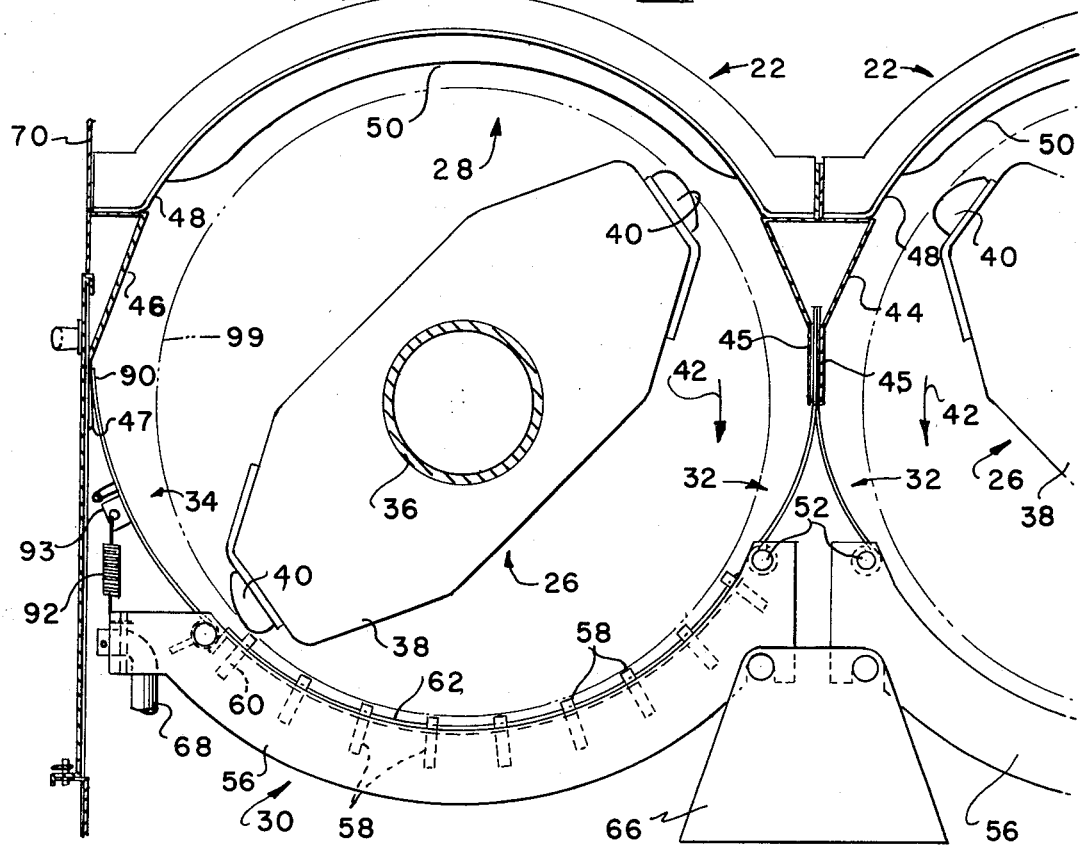
FIG. 2 is a fragmentarial sectional view taken generally along the line 2—2 in FIG. 1.

In FIG. 2 only the left axial flow unit 22 is shown in full section, however the right axial flow threshing and separating unit is substantially identical in construction to the left axial flow threshing and separating unit. Each of the axial flow units 22 includes a longitudinally extending generally cylindrical casing having a rotor, indicated generally at 26, rotatably mounted therein. Each cylindrical casing includes, as can best be seen from FIG. 2, an upper longitudinally extending cylindrical portion, indicated generally at 28, a lower, longitudinally extending concave portion, indicated generally at 30, and inner and outer spaced apart side plate structures, indicated generally at 32, 34, respectively.

Each of the rotors 26 includes a generally longitudinally extending tubular support member 36 carrying a radially outwardly extending structure 38, which in turn carries, on its radial outer peripheries, spaced apart removable threshing means in the form of rasp bars 40. As the rotors 26 are rotated in the direction of the arrows 42, crop material introduced into the units will be spirally conveyed rearwardly for threshing action between the rasp bars 40 and concaves 30, for separation of the grain from the "straw", and for subsequent discharge of the "straw". (The term "straw" as used in this specification refers to that crop material from which the grain is separated.) As can be seen from FIG. 2 the rasp bars or rotor threshing means will first pass over the inner side plate structure 32, then the concave structure 30, and then the outer side plate structure 34.

The upper portion 28 of the casing includes an inner upper portion 44, an outer upper portion 46, and an intermediate upper portion 48, the intermediate upper portion 48 having spirally disposed transport fins 50 mounted thereon. The fins 50 cooperate with the rotating rotor to spirally advance the crop material through the units. The inner, intermediate, and outer upper portions, 44, 48, 46, respectively, are secured to each other. In the double rotor axial flow combine shown in FIG. 2 the outer and intermediate portions 46, 48 of one unit are interconnected to the outer and intermediate portions of the other unit through a common inner unit 44. The inner unit has spaced apart downwardly depending members 45 which can slideably receive adjacent upper portions of the inner side plate structures 32.

The inner side plate structure 32 is pivotally mounted along an inner longitudinal edge of the concave at 52 and the upper portion of the inner side plate structure 32 is slideably disposed within the spaced apart downwardly depending members of the inner upper cylindrical portion 44 of the units in a manner best illustrated in FIG. 2.

The concave 30 has front and rear circularly curved transversely extending members 54,56, respectively. The front and rear members 54,56 are jointed together by longitudinally extending parallel concave bars 58 welded thereto and extending above the upper edge of the end members to provide the threshing action in cooperation with the rasp bars. One of the concave bars forms an outer side edge of the concave, this concave bar being indicated at 60. The concave bars 58 and 60 are provided with a series of aligned apertures through which curved rods or wires 62 may be disposed. The spacing between the rods 62 can be changed by removing and/or repositioning the rods. Thus, various cell spacings may be achieved between the concave rods to provide for the better separation of different types of crop material. As can be seen from FIG. 4 the outer end of each rod is formed with a bent portion 64. This bent portion serves as a handle by which the rod or wire can be engaged to insert it or remove it from the bars 58,60. In addition, the bent portion or handle of each rod is also utilized to hold the wire in its normal working position when the outer side plate member 34 is disposed in its normal operative working position, the bent portion lying against the outer longitudinal edge of the outer bar 60.

Means are provided to vertically shift the concave with respect to the rotor 26. Such a vertical shifting is necessary to provide for the threshing of a variety of different crops. Thus, for example, corn would require a greater spacing between the rotor and the cylinder than would grass seed. The means to adjust the concaves vertically is not material to the present invention but may be of the type more fully illustrated in copending application Ser. No. 51,251, filed June 30, 1970. However, it should suffice to note that both the trapezoidal member 66 and the rod 68 are vertically shiftable to provide for the vertical adjustment of the concave. It should be observed at this point that as the concave is moved vertically to vary the spacing that the inner and outer side plate structure 32, 34, respectively will move with the concaves.

The outer side plate structure 34 has its lower edge removably secured to the outer longitudinal edge of the transversely extending edges 54, 56 of the concave. The upper edge of the outer side plate structure is biased against a generally vertically extending surface 47 of the outer upper portion 46. Due to positioning of the inner side plate structures in the manner illustrated in FIG. 2 and the biasing of the outer side plate structure 34 against the generally vertical surface 47, the generally cylindrical shape of the casing is maintained during the adjustment of the concaves. It should be noted at this juncture that while both inner and outer side plate structures have been illustrated that this invention is primarily concerned with the outer removable side plate structure 34.

As can best be seen from FIGS. 1 and 3, the side 70 of the combine is provided with a removable cover 72 which normally closes an opening 74

As can best be seen from FIG. 1 and 3, the side 70 of the combine is provided with a removable cover 72 which normally closes an opening 74 in the side 70. The manner in which the cover 72 is secured to the side 70 is not material to the present invention, however, it should be noted that the cover can be easily removed and replaced. Upon the removal of the cover 72 access may be had to the outer side plate structure 34.

Figure 5:
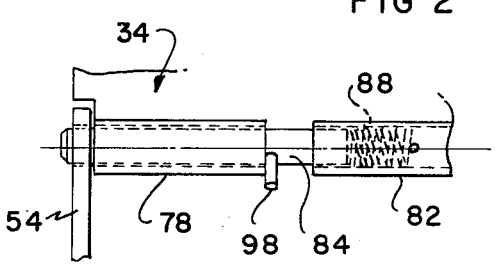
FIG. 5 is an enlarged side view of one of the detachable mountings of the side plate structure.
Figure 4:
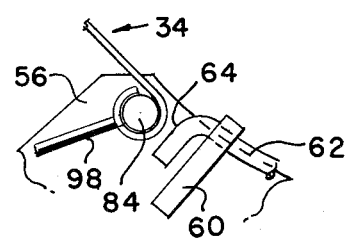
FIG. 4 is an enlarged detailed view of FIG. 2 showing the manner in which the concave rods or wires are held in their normal operative working position.

The concave extension or outer side plate structure 34 is provided with front and rear tubular sections 78, 80, and an intermediate spaced apart tubular section 82. Front and rear longitudinally shiftable pins are disposed respectively in the front and intermediate tubular sections and the rear and intermediate tubular sections. The end of each of the pins is biased away from the intermediate portion 82 by a spring 88 within the intermediate tubular section, only one such spring being shown in FIG. 5. That end of each pin 84, 86 which is spaced furthest away from the intermediate portion 82 is disposed within an aperture in the front or rear transverse concave member 54, 56, as is best shown in FIGS. 3 to 5. When the outer side plate structure is disposed in this manner the lower inner surface of the various tubular sections restrain the rods 62 from movement outward of the associated concave bars. It should also be noted at this point that when the outer side plate structure is mounted in the foregoing manner it is shiftable with the concave as it moves upwardly and downwardly and is also shiftable about the axis defined by the pins 84,86. In order to maintain the upper portion 90 outer side plate member 34 in its desired position, the upper portion 90 is biased outwardly against a generally vertically extending member 47 which is in fact a lower portion of the outer upper portion 46. One form of spring structure is shown in FIGS. 2 and 3 and consists of helical tension springs 92 whose upper ends engage an outwardly projecting tabs 93 mounted at the front and rear of the outer side plate structure 34, and the lower end engaging apertures within the front and rear transverse concave members 54,56.

An alternate spring biasing construction is shown in FIG. 9 and consists of a leaf spring 94 mounted on the cover 72 and projecting through a handle 96 on the outer side plate structure, the leaf spring acting to bias the outer side plate structure 34 towards the lower end of the structure 46, namely the vertically extending surface 47.

In order to remove the outer side plate structure 34 to provide access to the interior of the casing and also to the rasp bars 40 mounted on the rotor 26 it io only necessary to disconnect the spring structure and shift the front and rear pins 84,86 towards the intermediate tubular section 82. To this end, outwardly projecting pins 98 are provided on each of the pins 84,86 and by engaging pins 98 the pins 84,86 can be shifted towards each other freeing the outer ends of the pins 84,86 from the apertures in the front and rear transverse concave members 54,56. At this time the handles 96 on the outer side plate structure can be engaged and the entire side plate structure be lifted out to provide the desired access.

As can be seen from FIG. 2, that the upper surface of the outer side plate structure is disposed further away from the radial outer periphery 99 of the rotor 26. This is to permit the material held in a compressed state between the rasp bar 40 and the concave 30 to expand while at the same time permitting any grain material which has been threshed to separate through apertures which may be provided in the outer side plate structure.

As had previously been noted, it is one of the objects of the invention to provide different side plate or concave extensions for different crop conditions. Thus, when working in small grains it may be desirable to utilize a side plate of the type generally illustrated in FIG. 3 which consists of essentially sheet metal having spaced apart apertures 100. However, when threshing corn it may be desirable to in effect extend the concave and to this end a concave extension of the type shown in FIGS. 7 and 8 may be employed, this form of concave extension or side plate structure being referred to as a cell grate structure. The cell grate has longitudinally extending bars 102, which are generally similar to the bars of a concave. The bars 102 are interconnected by front and rear transverse members 104 which also interconnect the upper portion 106 of the outer side plate structure, the upper portion being generally a curved sheet metal construction. Rods 108 extend through the bars 102 in the manner best shown in FIG. 7. Finally, tubular members 110 are secured at the lower inner end of the outer side plate structure shown in these figures, these tubular portions being adapted to receive pins which in turn secure the cell grate side plate structure to the concave 30 in the same manner as the apertured side plate structure of FIG. 3. In some situations it may be desirable to employ an outer side plate structure having no apertures for further separation, such as for example when combining grass seed. An impervious member 112 is shown in FIG. 6.

By providing the removable outer side plate structures, not only is access provided to the interior of the cylindrical casing to provide servicing of the concave and/or rasp bars, but also it is possible to change the nature of the cylindrical casing by substituting different side plate structures depending upon the nature of the crop material to be worked upon. Thus a move advantageous threshing and separating action can be achieved by utilizing various different forms of removable side plate structures.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

Having thus described our invention what we claim is:

1. In an axial flow combine having a frame adapted to be propelled forwardly over a field of grain bearing crop material, at least one axial flow unit mounted within the frame, and grain handling and cleaning means disposed below said axial flow unit, said axial flow unit including a generally cylindrical longitudinally extending casing and a rotor mounted for rotation within said casing, said casing having an upper longitudinally extending cylindrical portion and a lower longitudinally extending concave portion, and said rotor having theshing means mounted on the periphery thereof and operable upon rotation of said rotor to spirally advance crop material through said unit and to thrash grain from grain bearing crop material; the combination therewith of
side plate structure;
means removably mounting a lower edge of the side plate structure to the concave, the side plate structure extending upwardly therefrom to the upper cylindrical portion of the casing, said side plate structure being vertically shiftable with the concave, and the side plate being removable from the concave to provide access to the interior of the concave.

2. In an axial flow combine as set forth in claim 1 further characterized by the provisions of means biasing an upper portion of the side plate structure away from the rotor to hold the upper end of said side plate structure against a generally vertically extending surface.

3. In an axial flow combine as set forth in claim 1 wherein said side plate structure is apertured to permit threshed grain to pass therethrough to the grain handling and cleaning means disposed beneath the unit.

4. An axial flow combine as set forth in claim 3 wherein said apertured side plate structure has longitudinally extending members which cooperate with the threshing means on the rotor to give a further threshing action.

5. An axial flow combine as set forth in claim 1 wherein the upper end portion of the side plate structure is disposed radially further away from the rotor threshing means than the lower portion thereof.

6. In an axial flow combine of the type set forth in claim 1 wherein the rotor threshing means first passes over the concave and then, immediately thereafter, over said side plate structure, said side plate structure being apertured to provide for the further separation of grain.

7. In an axial flow combine as set forth in claim 1, wherein said side plate structure is impervious.

8. In an axial flow combine as set forth in claim 2 wherein said means biasing the side plate structure outwardly is a coil spring, the lower end of which is secured to the concave.

9. In an axial flow combine having a frame adapted to be propelled forwardly over a field of grain bearing crop material and a longitudinally extending threshing and separating unit mounted within the frame, said unit including a generally cylindrical casing and rotor rotatably mounted within the casing, said casing having a upper longitudinally extending cylindrical portion and a lower longitudinally extending concave portion having longitudinally extending bars and transversely extending rods, said concave being mounted within the frame for vertical shifting movement relative to the upper portion thereof, the combination there of side plate structure, means removably mounting a lower edge of the side plate structure to a longitudinal edge of the concave, the side plate structure extending upwardly therefrom to the upper cylindrical portion of the casing, said side plate being vertically shiftable with said concave, and the side plates being removable from the concaves to provide access to the interior of the concave and also to permit the removal of the transversely extending concave rods.

10. In an axial flow combine having a wheeled frame adapted to be propelled forwardly over a field of grain bearing crop material, a pair of side-by-side longitudinally extending axial flow threshing and separating units mounted within the frame, each of said units including a generally cylindrical casing and a rotor mounted for rotation within the casing, said casing having an upper longitudinally extending cylindrical portion and a lower longitudinally extending vertically shiftable concave portion, the rotor of each unit having a plurality of circumferentally spaced apart rasp bars, the rotor being operable upon rotation to cause the rasp bars in cooperation with the associated concaves to thresh grain from unthreshed grain bearing crop material introduced into said unit and spirally advance the crop material through said unit while separating a proportion of the threshed grain which passes through said concave to grain handling and cleaning means disposed underneath said axial flow units, the combination therewith of a pair of outer side plate structures, means removably mounting a lower edge of each of the outer side plate structures to the outer longitudinal edge of each of the concaves, each of the outer side plate structures extending upwardly therefrom to the associated upper cylindrical portion of the casing, said side plates being vertically shiftable with said concaves and removable from the concaves to provide access to the interior of the casing.

11. In an axial flow combine as set forth in claim 10 wherein each of the outer side plate structures is of a length to the concave.

12. In an axial flow combine as set forth in claim 10 further characterized by the provision of a pair of inner side plate structures mounted on said concave portions and extending upwardly therefrom.

13. In an axial flow combine having a frame adapted to be propelled forwardly over a field of grain bearing crop material, at least one axial flow unit mounted within the frame, and grain handling and cleaning means disposed below said axial flow unit, said axial flow unit including a generally cylindrical longitudinally extending casing and a rotor mounted for rotation within said casing, said casing having an upper longitudinally extending cylindrical portion and a lower longitudinally extending concave portion, and said rotor having threshing means mounted on the periphery thereof and operable upon rotation of said rotor to spirally advance crop material through said unit and to thresh grain from grain bearing crop material; the combination therewith of inner and outer side plate structures disposed along opposite longitudinal edges of said concave portion and extending upwardly therefrom, the upper portion of each side plate structure being held in sliding contact with associated portions of the upper longitudinally extending cylindrical portion of the casing, and mounting means removably securing one of said side plate structures to said concave whereby said side plate structure may be removed to provide access to the interior of said casing.

14. In an axial flow combine as set forth in claim 13 wherein said mounting means includes spring biased pins normally biased into longitudinally aligned apertures in said concave portions, and means operable to shift said pins out of said apertures to permit removal of said one side plate.

* * * * *